US005310302A

United States Patent [19]

Ferguson, Sr.

[11] Patent Number: 5,310,302

[45] Date of Patent: May 10, 1994

[54] DUMPING HOPPER AND TRAILER WASHING STAND

[76] Inventor: John H. Ferguson, Sr., P.O. Box 116, Lindwood, N.C. 27299

[21] Appl. No.: 862,986

[22] Filed: Apr. 6, 1992

[51] Int. Cl.[5] .................... B65G 65/23

[52] U.S. Cl. .................... 414/424; 414/420; 414/607; 414/608

[58] Field of Search .................... 414/607, 608, 422, 424, 414/404, 420

[56] References Cited

U.S. PATENT DOCUMENTS

| | | | |
|---|---|---|---|
| 2,482,692 | 9/1949 | Quales et al. | 414/607 |
| 2,582,759 | 1/1952 | Sass | 414/607 |
| 2,601,163 | 6/1952 | Miller | 414/386 |
| 3,013,684 | 12/1961 | King et al. | 414/422 X |
| 3,270,900 | 9/1966 | Sherman | 414/422 X |
| 3,486,648 | 12/1969 | DeWald | 414/420 |
| 3,633,971 | 1/1972 | Berky | 278/10 |
| 3,689,318 | 9/1972 | Phillips | 134/23 |
| 3,877,593 | 4/1975 | Sleziak | 414/422 |
| 3,881,617 | 5/1975 | Miller et al. | 414/422 |
| 3,973,988 | 8/1976 | McMahon | 134/46 |
| 3,984,017 | 10/1976 | Giles | 414/414 |
| 4,106,516 | 8/1978 | Wiegand | 134/45 |
| 4,348,153 | 9/1982 | Johnson | 414/424 X |
| 4,403,901 | 9/1983 | Kopczynski | 414/424 X |
| 4,405,278 | 9/1983 | Kvalheim | 414/424 X |
| 4,408,946 | 10/1983 | Haven et al. | 414/424 |
| 4,561,822 | 12/1985 | Schmook | 414/422 |
| 4,705,446 | 11/1987 | Miller | 414/422 |
| 5,011,360 | 4/1991 | Abram et al. | 414/424 |

FOREIGN PATENT DOCUMENTS

| | | | |
|---|---|---|---|
| 2909532 | 9/1980 | Fed. Rep. of Germany | 414/422 |
| 1533999 | 1/1990 | U.S.S.R. | 414/607 |

*Primary Examiner*—David A. Bucci

*Attorney, Agent, or Firm*—Rhodes, Coats & Bennett

[57] ABSTRACT

A dumping hopper and truck trailer washing stand used in connection with cleaning the interior of a truck trailer. The hopper and stand together form a trailer washing apparatus. The stand includes support legs that extend from a ground surface to a platform. Beneath the platform is a container storage area where the hopper can be positioned beneath the platform. To clean the interior of a truck trailer, a truck is positioned adjacent to the stand while the hopper is located below the platform. Waste material is washed from the interior of the trailer and onto the stand's platform. The waste material falls through a grate on the platform and into the hopper located below the stand. A frame structure on the hopper enables the hopper to be transported and vertically positioned by a fork lift. The hopper has a loading position where the hopper is in an upright position with waste material held therein and a dumping position where the hopper is in a tilted-downward position. When the hopper is in a dumping position and as the hopper is being lowered, the frame structure of the hopper is pressed against a ground surface. The pressing of the frame structure against the ground surface converts the force associated with lowering the hopper to a rotational force that rotates the container apparatus to an upright, loading position without the need of a motor.

13 Claims, 3 Drawing Sheets

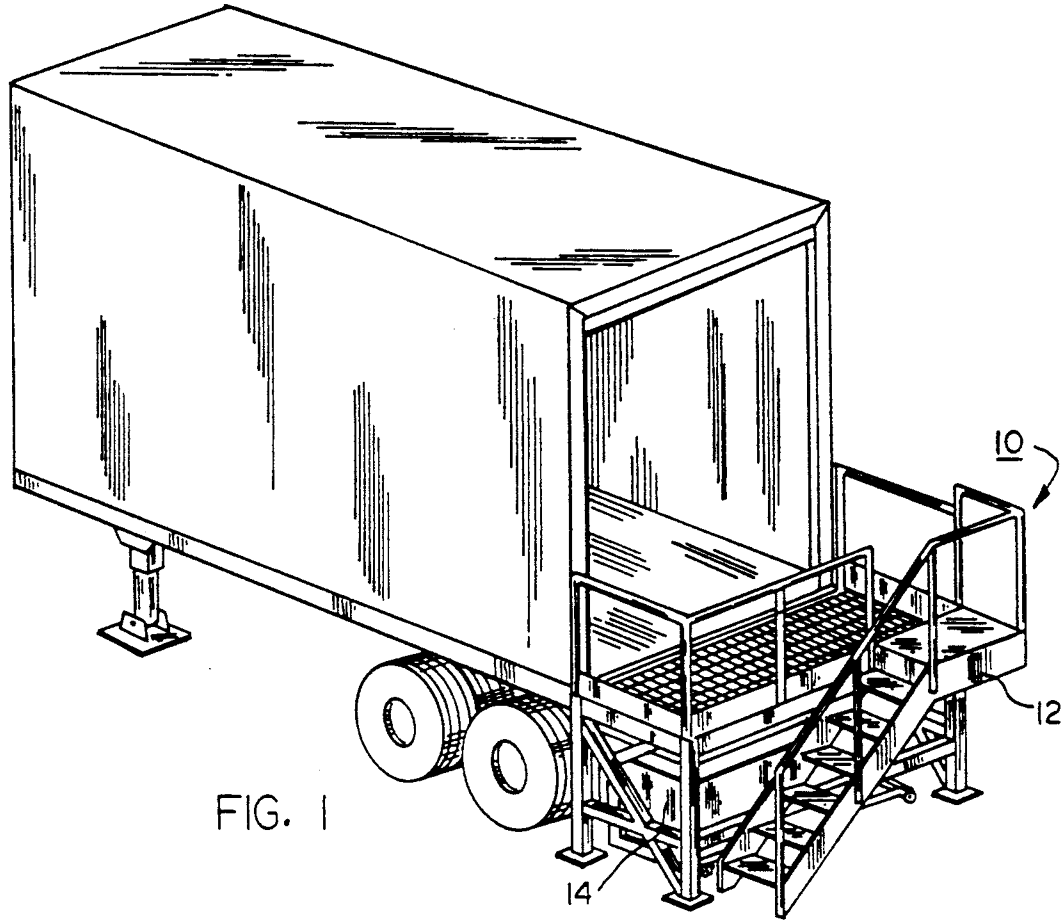
FIG. 1
FIG. 2
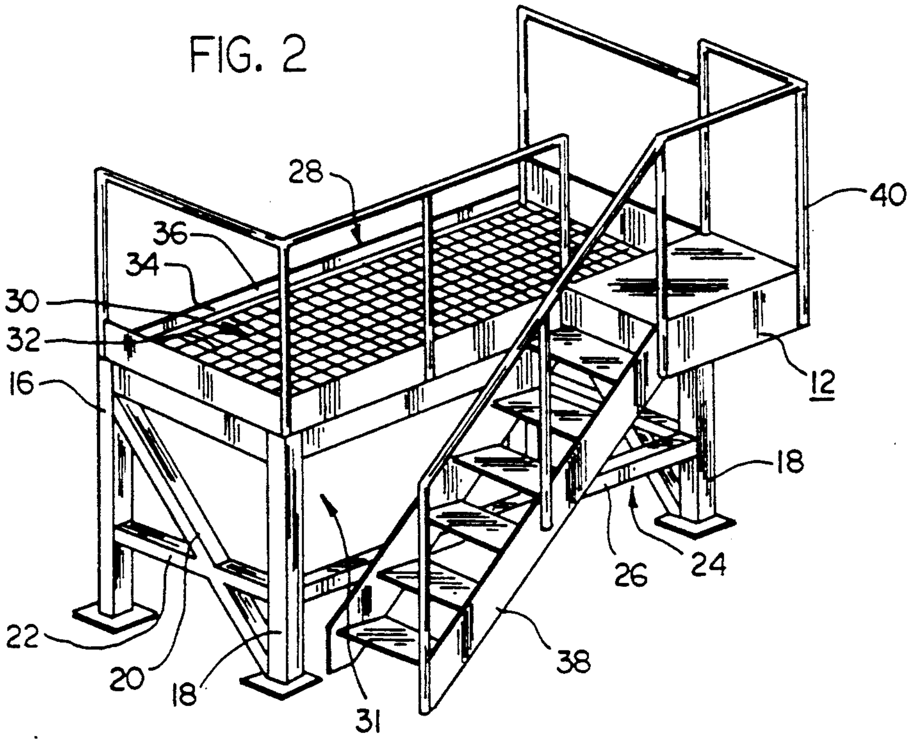

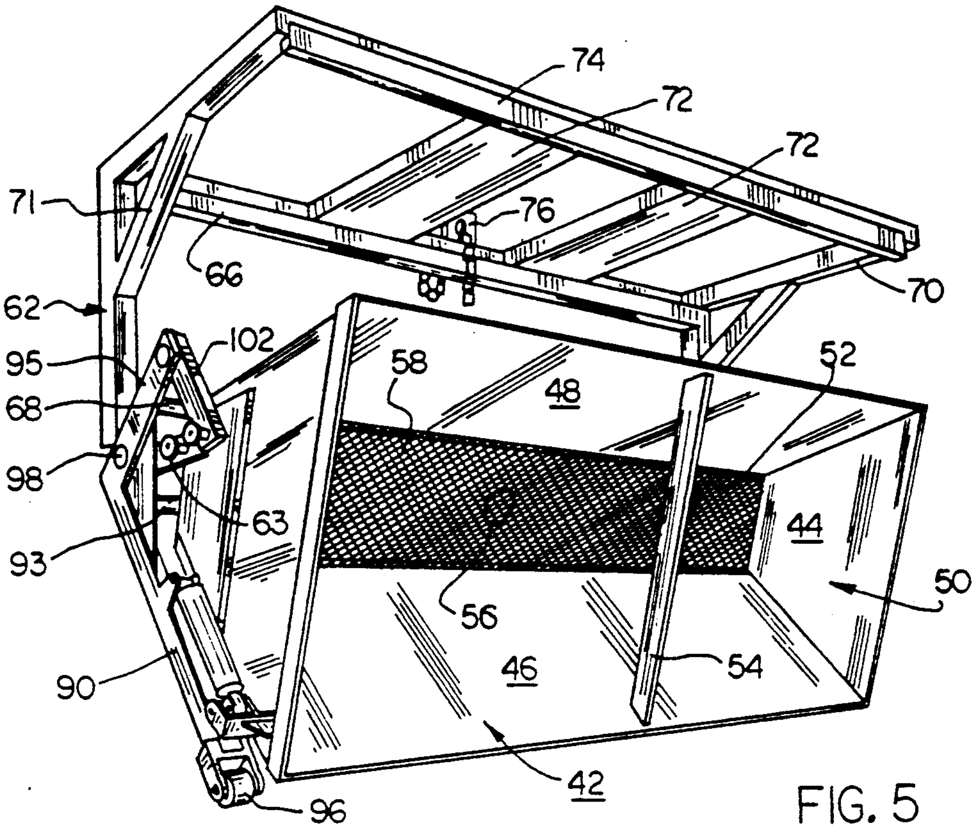
FIG. 5
FIG. 6
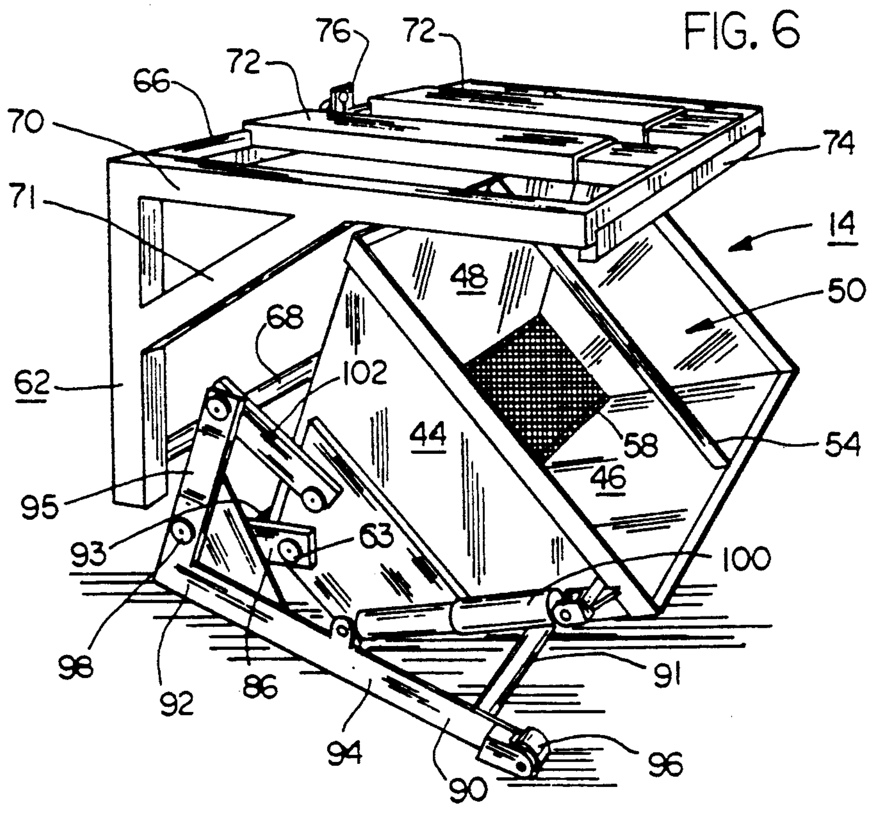

DUMPING HOPPER AND TRAILER WASHING STAND

FIELD OF THE INVENTION

The present invention relates generally to a hopper and trailer wash stand, and more particularly, to a dumping hopper and a trailer wash stand used in connection with washing the interior of truck trailers.

BACKGROUND OF THE INVENTION

The interiors of truck trailers must be periodically cleaned. The trailer is typically washed by a person standing inside the trailer who sprays water around the interior and forces waste material out the back of the trailer. The trailer is ordinarily positioned next to a floor drain which receives the water and waste material washed from the back of the trailer. In U.S. Pat. No. 4,106,516, issued Aug. 15, 1978, the truck trailer washing system disclosed shows an ordinary floor drain for collecting the wash water and waste material from the trailer.

One problem with this method of cleaning a truck interior is that a person spraying the truck interior may slip and be injured while washing the trailer. The person doing the cleaning of the trailer may slip and fall from the open trailer. Because of the wash water, the trailer floor surface becomes slippery and dangerous for the person standing in the trailer.

Another problem with this prior art method of cleaning truck trailers is that in order to wash the truck trailer, a floor drain must be available and the truck trailer must be positioned next to the floor drain. However, a floor drain may not be available or positioning the truck trailer at the floor drain may not be convenient. Thus, the inability to selectively reposition the location of the floor drain is a disadvantage in this method of cleaning out the interior of a truck trailer. In addition, the floor drain must be able to handle the solid waste that will be washed from the truck trailer and into the drain. Removal of solid waste that collects in the floor drain is often difficult because of the below surface location of the floor drain. Moreover, environmental and sewage treatment considerations suggest that solid waste disposal of such debris is needed.

Hoppers are sometimes used to hold solid waste material pending its dumping into a waste hauling vehicle or the like. However, these hoppers are not convenient for the collection and dumping of the solid waste materials washed from the interior of truck trailers and otherwise. The hoppers used in the past for holding solid waste material could not be conveniently transported and then adjusted between a loading position and a dumping position.

Accordingly, there is a need in the art for an inexpensive truck washing apparatus to permit rapid, safe trailer cleaning, with collection of washed-out debris for easy, environmentally safe disposal.

SUMMARY OF THE INVENTION

The present invention fulfills this need by providing a dumping hopper and washing stand used in connection with washing the inside of vehicle trailers. The dumping hopper may be used for numerous dumping functions, but is specifically designed to be used with the associated washing stand. The dumping hopper and washing stand together form a truck trailer washing apparatus.

The truck trailer washing apparatus includes a stand with a platform and a hopper which fits under the platform. The platform has a platform grate that allows waste material washed from the trailer to pass through the platform and that also provides a slip-resistant surface. A stairway leads from the ground surface to the platform and provides safe access to the platform. A guard-rail is attached to the stand for providing a handhold for a person using the washing stand.

The dumping hopper includes an upper frame assembly that is pivotally attached to a container used to hold the waste material. The upper frame assembly includes means to lift the hopper by means of a conventional fork lift. A lower frame assembly is pivotally connected to the upper frame assembly and is also pivotally attached to the container at a separate pivot location. The container is positionable between a generally horizontal upright position and a downward-tilted, dumping position. The upper frame assembly is pivotally connected to the container at a location that is horizontally offset from the center of gravity of the container such that the container tends to pivot on the upper frame assembly from an upright position to a downward-tilted position.

To use the trailer washing apparatus, the stand is positioned in a selected location and the hopper is then positioned beneath the stand. When the trailer washing apparatus has been placed in this collection position, the load opening of a trailer is positioned adjacent to the washing stand. The interior of the trailer is then washed out with a hose by a person having access to the trailer from the washing stand. The waste material from the interior of the trailer is directed onto the stand and then through the platform such that solid waste material collects in the container of the hopper. After the trailer has been cleaned or when the hopper is full, the hopper is transported by a fork lift vehicle to a dump location such as a waste hauling truck so the waste material can be deposited.

To dump a container loaded with waste material, a person unlatches the container such that the container pivots by gravity from the upright, loading position to the downward-tilted, dumping position, discharging the contents of the hopper. After dumping, the container is repositioned in its loading position by lowering the hopper. As the hopper is lowered, the uprighting frame contacts the ground surface and causes the dumping container to be rotated to an upright, loading position. The uprighting frame converts the downward force associated with the lowering of the hopper into a rotational force that rotates the container from the downward-tilted, dumping position into the upright, loading position.

BRIEF DESCRIPTION OF THE DRAWINGS

The invention will be better understood from a reading of the Detailed Description of the Preferred Embodiment, along with a review of the drawings in which:

FIG. 1 is a perspective view of the dumping hopper and trailer washing stand in a collection position with a truck trailer positioned adjacent thereto;

FIG. 2 is a perspective view of the washing stand, without the hopper;

FIG. 5 is a perspective elevation view of the hopper in a downward-tilted, dumping position;

FIG. 6 is a perspective view of the hopper in an intermediary position as the hopper is being lowered and forced to rotate from a downward-tilted, dumping position to an upright, loading position.

DETAILED DESCRIPTION OF THE PREFERRED EMBODIMENT

Figure 3:
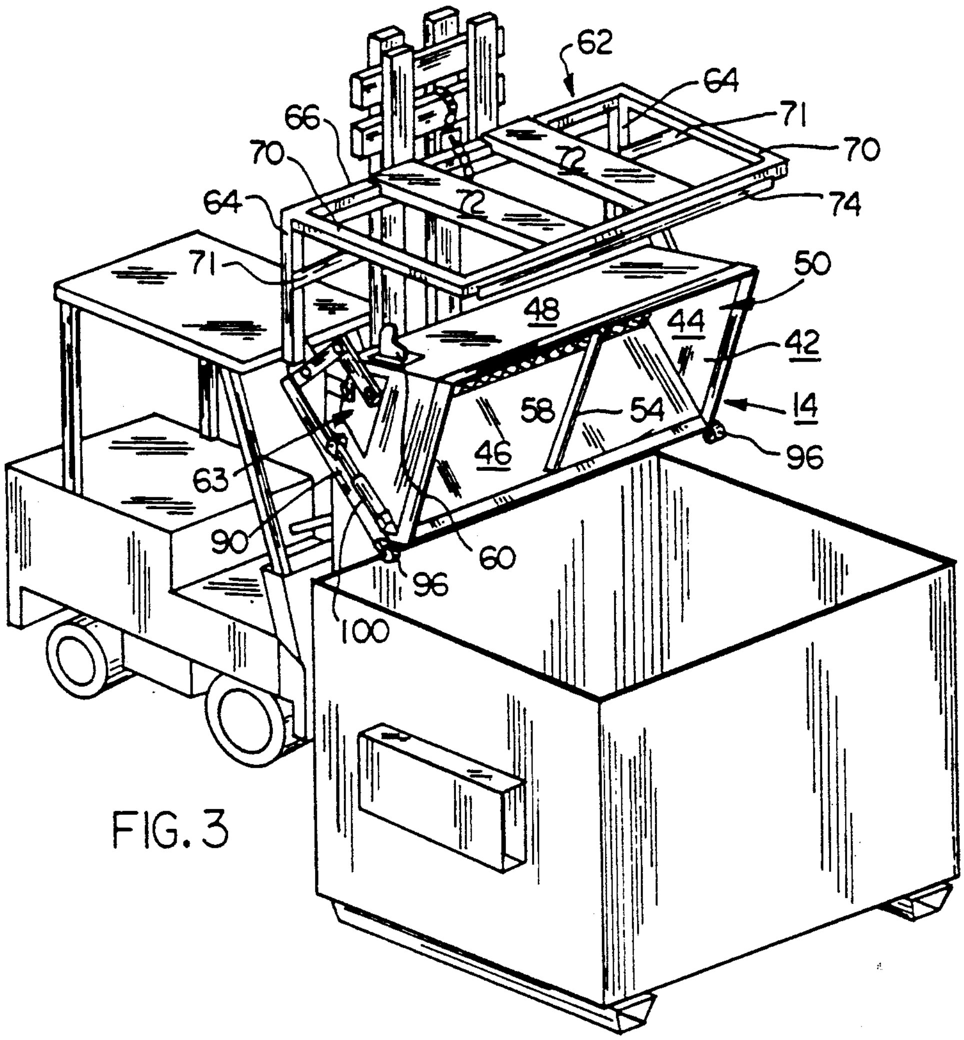
FIG. 3 is a perspective view of the hopper elevated by a fork truck having just been dumped.

With further reference to the drawings, the truck trailer washing apparatus of the present invention is shown therein and indicated generally by the numeral 10. The two main components of the truck trailer washing apparatus 10 are a washing stand and a hopper that are indicated generally by the numerals 12 and 14, respectively. As shown in FIG. 1 and discussed in more detail below, hopper 14 fits beneath stand 12 to provide an apparatus for aiding in the cleaning of the interiors of truck trailers.

Referring to FIG. 2, stand 12 includes a support frame 16 having legs 18 that extend vertically upward from a ground surface. The support frame 16 has a generally rectangular shape with pairs of legs 18 at opposite sides of support frame 16. Each pair of legs 18 has a diagonal support member 20 and a horizontal support member 22. Located on the backside 24 of support frame 16 is a cross-member 26. The opposite side 28 of support frame 16 has a hopper access opening to permit insertion and removal of the hopper 14 into a hopper space 31 that is surrounded by stand 12.

A platform 30 rests upon support legs 18 above hopper space 31 and includes a generally rectangular grate 32. The grate 32 is made out of strong metallic material that provides sufficient strength for a person to stand thereon and has openings that allow solid waste material to pass. Rubber bumpers 34 are attached to the platform 30 above the hopper access opening so that the side 28 simulates the contact provisions of a loading dock. A rubber flap 36 extends outward from the platform 30 below the bumpers 34 to direct water and debris falling between the bumper and truck parked thereat to the hopper 14. Stairs 38 extend from the ground surface to the platform 30 at the backside 24 of support frame 16. A railing 40 extends along stairs 38 and around the back and side portions of platform 30.

The second major component of truck trailer washing apparatus 10 is the hopper 14 which is illustrated in FIG. 3 as raised by a fork truck. Hopper 14 includes a container 42, carrier frame 62, and an uprighting frame 90. Container 42 includes side walls 44, a tapered front wall 46, and a tapered back wall 48. Tapered front wall 46 and tapered back wall 48 taper inwardly from an open top 50 to a bottom 52 (see FIG. 5). Fixed to the tapered back wall 48 is a container-latch mount 60, shown in FIG. 4, for latching container 42 in an upright position. Open top 50 has a support bar 54 that extends between the front wall 46 and back wall 48 to provide additional support to the container 42. Bottom 52 includes a drain opening 56 (see FIG. 5) for allowing liquid waste to drain therethrough. A container grate 58 is positioned adjacent to bottom 52 to prevent solid waste material from clogging drain opening 56.

The carrier frame 62 is pivotally connected to container 42 by pivot members 63. Carrier frame 62 includes a pair of vertical members 64 that are connected together by an upper transverse member 66 and a lower transverse member 68 (see FIG. 6). Extending outward from opposite ends of the upper transverse member 66 are upper extension members 70. Diagonal member 71 extends diagonally from a vertical member 64 to the attached extension member 70 to brace the upper frame assembly 62. Between upper extension members 70 are a pair of tubing members 72 that also extend outwardly from upper transverse member 66. An end member 74 extends horizontally along the extended ends of the upper extension members 70 and tubing members 72.

The tubing members 72 are hollow and have openings at the upper transverse member 66 such that forks from a fork lift can be inserted therein. Tubing members 72 provide a connection means for a fork lift to engage and connect with hopper 14. A bracket 76 (see FIG. 5) is also connected to the upper transverse member and used to chain the carrier frame 62 to a fork lift once the tubing members 72 have been engaged by the lift. The chain securing the fork lift to bracket 76 helps ensure that the hopper 14 does not inadvertently slip off the forks of the fork lift. Extending from lower transverse member 68 are lower extension member 86. The container 42 is pivotally connected between the lower extension members 86 by pivot members 63. Pivot members 63 are located on container 42 at a location that is horizontally offset from the container's center of gravity. The location of pivot members 63 causes container 42 to tend to rotate by gravity from an upright position as seen in FIG. 1 to a downward tilting position as seen in FIG. 3.

Figure 4:
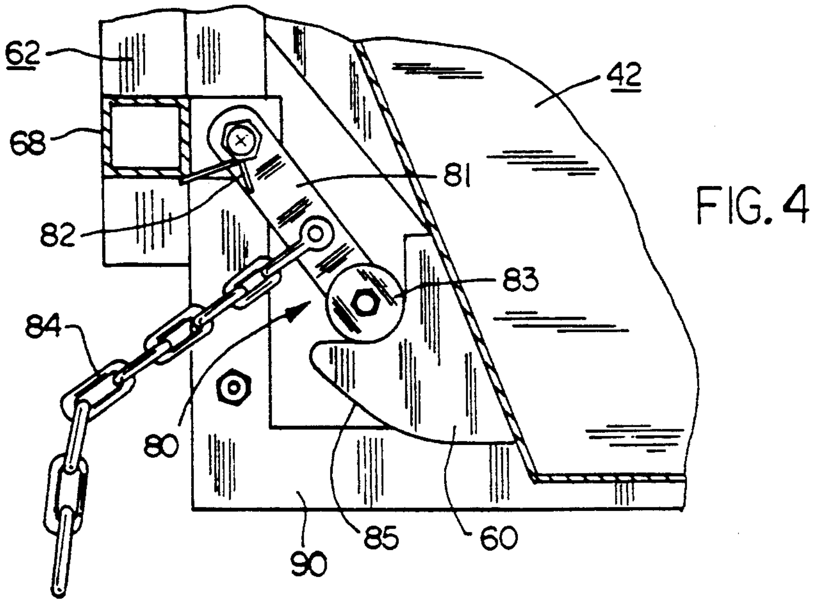
FIG. 4 is a partial side view of the latching mechanism of the present invention.

A latch 80, shown in FIG. 4, is used to lock container 42 in an upright position. Latch 80 includes a latch arm 81, a container-latch mount 60, a spring mount 82, and a latch chain 84. One end of latch arm 81 is pivotally mounted to the carrier frame 62 by a spring mount 82 which is fixed to lower transverse member 68. Spring mount 82 biases the latch arm 84 in a counter-clockwise direction (in the view of FIG. 4) such that the opposite end of latch arm 81 engages container-latch mount 60 which is fixed to a lower portion of the container's back wall 48. A latch chain 84 is attached to latch arm 81 to allow a user to disengage the latch arm 81 from latch mount 60 by pulling the chain 84. A roller 83 affixed to the terminal end of latch arm 81 reduces friction in the release of the container. Also, when resetting the latch, the roller 83 rides on cam surface 85 of the mount 60 to automatically re-engage the latch.

Referring to FIG. 6, the uprighting frame 90 includes a pair of generally L-shaped lever members 92, one on either side of the hopper 14, and only one of which is visible in FIG. 6. Lever members 92 are connected together by horizontal members 91 and 93. Each lever member 92 is comprised of an extension member 94 and a vertical member 95. Rotatably mounted at the outer end of each extension member 94 is a wheel 96 that engages the ground, as will be hereinafter described.

The uprighting frame 90 is pivotally connected to the carrier frame 62 by pivot members 98. The uprighting frame 90 is also connected to the container 42 by a link member 102. The link member 102 is pivotally attached at one end to the vertical member 95 of the uprighting frame 90, and at the opposite end to the container 42. When the container 42 rotates from the upright position to a dumping position, the link member 102 causes lever members 92 to rotate clockwise in the perspective of FIG. 5 to a position as shown in FIG. 5.

When container 12 is rotated from a loading position, shown in FIG. 1, to a dumping position, shown in FIG.

3, container 42 is rotated about axis 63 and lever members 92 are rotated about axis 98. As shown by a comparison of FIG. 1 and FIG. 5, container 42 has an angle of rotation about axis 63 which is greater than the angle of rotation of the lever member 94 about axis 98. Fixing vertical member 95 at an angle to extension member 94 (90° in the preferred embodiment) causes container 42 to be rotated through a greater angle of rotation as the lever member 94 is rotated through a lesser angle of rotation. Link member 102 enables the lever member 92 to be attached to the container 42 at a location that causes container 42 to be fully rotated from the downward-tilted position shown in FIG. 5 to the upright position shown in FIG. 1.

One end of shock absorber 100 is pivotally connected along the intermediary portion of the lower extension member 94, while the opposite end of shock absorber 100 is pivotally connected to the container side wall 44. The function of the shock absorber 100 is to slow the motion of the container 42 as it moves from the upright position to the dumping position. A similar shock absorber and the other side-located components are provided on the other end of the hopper 14, in symmetrical arrangement.

In operation, hopper 14 is normally in a loading position for receiving material and rotates to a dumping position for dumping material from container 42. In the loading position, as shown in FIG. 1, container 42 is in an upright position such that waste material can be deposited and held by the container 42. Water may drain through hole 56. If desired, the hole 56 may be omitted. When in the loading position, the end of latch arm 81 is engaged in the container-latch mount 60 to maintain container 42 in an upright position.

After container 42 has been filled, the dumping hopper 14 is lifted and carried to a dumping site where the contents of the hopper 14 can be dumped. The hopper 14 is lifted by inserting the forks of a standard fork lift into the tubing members 72 and raising the forks. The hopper 14 is then carried to the dumping site. The latch 80 keeps the container 42 upright even when lifted off the ground.

To dump the material within container 42, the operator of the lift pulls latch chain 84 to disengage the latch arm 81 from container latch mount 60. Because lower extension member 86 of carrier frame 62 is pivotally connected to container 42 at a position which is horizontally offset from the container's center of gravity, the container 42 rotates forwardly about pivot members 63 and into the down-turned, dumping position shown in FIG. 5. Material contained in container 42 is dumped as the container 42 moves from its loading position to its dumping position.

After the material has been dumped from container 42, hopper 14 is repositioned to an upright, loading position. To reposition hopper 14, the operator of the fork lift lowers hopper 14. As shown in FIG. 6, when the down-turned container is lowered, wheels 96 of extension member 94 contact the ground. The contact of the lever members 92 with the ground causes the uprighting frame 90 to be rotated about pivot members 98. As uprighting frame 92 is rotated, wheels 96 roll along the ground surface and the extension members 94 move outwardly along the ground surface.

The rotation of lever members 92 about pivot member 88 causes link member 102 to be pulled by vertical member 95. The force applied to container 42 by the link member 102 causes the container 42 to rotate on the carrier frame 62 around pivot member 63.

As shown in FIG. 6, the pulling forces generated by the lowering of hopper 14 results in the container 42 being rotated from a downward-tilted position to an upright position. Container 42 assumes the completely upright position, shown in FIG. 1, prior to the hopper being fully lowered to the ground surface. As container 42 is positioned in a fully upright position, latch arm 81 is re-engaged with latch mount 60 to secure container 42 in a loading position. It does so by having the cam surface 85 of the mount 60 pass by the roller 83 of the latch arm 81 until the mount 60 clears the arm 81, resetting the latch.

The above described stand 12 and hopper 14 are used in conjunction to provide a truck trailer washing apparatus 10. Truck trailer washing apparatus 10 operates as follows. First, stand 12 positioned at a selected location, preferably over a drain to a sewer-septic tank. Hopper 14 is attached to a lift vehicle having fork appendages by inserting the fork appendages into tubing members 72 of carrier frame 62. A chain (not shown) may then be inserted through bracket 76 and attached to the lift vehicle to provide a safety attachment. Latch 80 secures container 42 in an upright, loading position.

The properly attached hopper 14 is then inserted through stand opening 28 and beneath platform 30. Cross members 26 which extend horizontally across the back of support frame 16 prevent the hopper from being inserted too far beneath the platform and help ensure that hopper 14 is correctly positioned to receive waste. Preferably, the drain 56 is aligned over the sewer or septic tank drain.

Once hopper 14 has been properly positioned in the space beneath platform 30, a truck trailer can be backed-up to the stand 12, as shown in FIG. 1. Desirably, the stand 12 is located at the lower end of a ramp so that water and debris gravitate out of the trailer to the stand. Bumpers 34 help absorb any impact that may occur as the truck trailer is backed into position adjacent to stand 12. When the trailer is properly positioned in relation to stand 12, a person accesses platform 30 by stairs 38. The elevated position of platform 30 positions the person at the opening of the trailer where the interior of the trailer is accessible. From this position on the platform 20, the person may enter the truck to spray the truck interior with water. The front of the trailer may be slightly elevated by positioning the trailer on the ramp. The elevation of the trailer causes wash water sprayed into the trailer to flow out of the back of the trailer and onto platform 30. The grating 32 in platform 30 allows both solid and liquid waste material to pass through platform 30 and into container 42 located below the platform 30. Waste falling between stand 12 and the end of the truck trailer is directed into container 42 by drainage flap 36. The railing 40 and grating 32 of stand 12 help prevent a person washing the interior of a trailer from slipping and falling. In particular, grate 32 provides a more effective footing than a smooth surface and railing 40 provides a hand hold for a person. Water drains from the container 42 through drain 56 while solid material is retained by grating 58.

Once the trailer has been sufficiently cleaned, the trailer is removed from the truck trailer washing apparatus 10. Additional trailers may be cleaned in sequence. When the container 42 is full, it can be dumped into a waste hauling truck to a landfill or the like, as described above.

As previously described and illustrated, hopper 14 repositions container 42 from a downward-tilted position to an upright position without the aid of a motor or additional machinery.

The present invention may, of course, be carried out in other specific ways than those herein set forth without departing from the spirit of the invention. The present embodiments are, therefore, to be considered in all respects as illustrative and not restrictive and all changes coming within the meaning and equivalency range of the appended claims are intended to be embraced therein.

What is claimed is:

1. A dumping hopper comprising:

(a) a carrier frame;

(b) a container pivotally attached to the carrier frame so as to be movable between an upright loading position and a downward tilted dumping position;

(c) a lift coupling on the carrier frame for coupling the carrier frame to a lift vehicle; and (d) an uprighting frame connected to the container for moving the container from the dumping position to the loading position in response to the carrier frame being lowered, wherein the uprighting frame is pivotally connected to the carrier frame and is moveable between a raised position when the waste container assumes a loading position and a lowered position when the waste container assumes a dumping position, the uprighting frame including:

(1) a lever member for engaging the ground when the waste container is lowered such that the engagement of the lever member with the ground causes the lever member to rotate from the ground engaging position to the raised position, and (2) a link member pivotally attached at one end to the lever member and at an opposite end to the container.

2. The dumping hopper of claim 1 wherein the container pivots about a first axis which is offset from the center of gravity of the container such that the gravitational force on the container tends to rotate the container from the loading position to the dumping position.

3. The dumping hopper of claim 1 wherein the lever member includes a wheel that engages the ground when the hopper is lowered so as to provide a contact point between the lever member and the ground for transferring force associated with the lowering of the hopper to the lever member, and wherein the wheel moves horizontally over the ground as the hopper is lowered.

4. The dumping hopper of claim 1 further including a latch for securing the container in an upright position, and wherein the latch is controllably disengageable.

5. The dumping hopper of claim 1 wherein the lever member is L-shaped.

6. A dumping hopper, including:

(a) a carrier frame apparatus;

(b) a container pivotally attached to the carrier frame at a first axis, and wherein the container is pivotable about the first axis between an upright, loading position for loading waste and a downward-tilted, dumping position for dumping waste contained in the container;

(c) coupling means for attaching the carrier frame apparatus and attached container to a lift vehicle; and (d) an uprighting frame including:

(1) a lever member pivotally connected to the carrier frame and having a ground engagement end, and (2) a link member pivotally connecting the lever member to the container, the lever member assuming a first position when the container is in a dumping position and assuming a second position when the container is in a loading position, the ground engagement end contacting the ground as the hopper is lowered while the container is in a dumping position, wherein force is exerted against the lever by the ground as the hopper is lowered to rotate the lever from the first position to the second position, and wherein as the lever is rotated from the lever's first position to the lever's second position, the link member pulls the container from the dumping position to the loading position.

7. The dumping hopper of claim 6 wherein a wheel is attached to the ground engagement end of the lever, and wherein the wheel moves horizontally over the ground as the hopper is lowered.

8. The dumping hopper of claim 6 wherein the lever member is L-shaped.

9. A dumping hopper comprising:

(a) a carrier frame;

(b) a container pivotally attached to the carrier frame so as to be pivotally between an upright loading position and a downward tilted dumping position;

(c) a lift coupling on the carrier frame for coupling the carrier frame to a lift vehicle; and (d) an uprighting frame pivotally connected to the container for moving the container from the dumping position to the loading position in response to the carrier frame being lowered, wherein the uprighting frame is pivotally connected to the carrier frame and is moveable between a raised position when the waste container assumes a loading position and a lowered position when the waste container assumes a dumping position, the uprighting frame including a lever member for engaging the ground when the waste container is lowered such that the engagement of the lever member with the ground causes the lever member to rotate from the lowered position to the raised position, the lever member including a wheel that engages the ground when the hopper is lowered so as to provide a contact point between the lever member and the ground for transferring force associated with the lowering of the hopper to the lever member, and wherein the wheel moves horizontally over the ground as the hopper is lowered, and wherein the uprighting means further includes a link member pivotally attached at one end to the lever member and at an opposite end to the container.

10. The dumping hopper of claim 9 wherein the lever member is L-shaped.

11. The dumping hopper of claim 10 further including a latch for securing the container in an upright position, and wherein the latch is controllably disengageable.

12. A dumping hopper, including:

(a) a carrier frame apparatus;

(b) a container pivotally attached to the carrier frame at a first axis, and wherein the container is pivotable about the first axis between an upright, loading position for loading waste and a downward-tilted, dumping position for dumping waste contained in the container;

(c) coupling means for attaching the carrier frame apparatus and attached container to a lift vehicle;

(d) an uprighting frame including a lever member pivotally connected to the carrier frame and having a ground engagement end with a wheel attached thereto, the lever member assuming a first position when the container is in a dumping position and assuming a second position when the container is in a loading position, the wheel of the lever member contacting the ground as the hopper is lowered while the container is in a dumping position, wherein the wheel moves horizontally over the ground as the hopper is lowered so as to rotate the lever from the first position to the second position, and wherein as the lever is rotated from the lever's first position to the lever's second position, the container is forced to rotate from its dumping position to its loading position, and wherein the uprighting frame includes a link member pivotally connecting the lever member to the container, and wherein the link member pulls the container from the dumping position to the loading position as the lever moves from the first position and the second position.

13. The dumping hopper of claim 12 wherein the lever member is L-shaped.

* * * * *